United States Patent [19]

Stamm et al.

[11] Patent Number: 5,663,973
[45] Date of Patent: Sep. 2, 1997

[54] TUNABLE NARROWBAND SOURCE OF A COHERENT RADIATION

[75] Inventors: Uwe Stamm; Ingo Klaft; Vadim Berger, all of Gottingen; Stefan Borneis, Fulda; Peter Lokai, Bovenden, all of Germany

[73] Assignee: Lambda Physik Gesellschaft zur Herstellung von Lasern mbH, Germany

[21] Appl. No.: 661,229

[22] Filed: Jun. 10, 1996

[30] Foreign Application Priority Data

May 14, 1996 [DE] Germany ............. 196 19 483.0

[51] Int. Cl.$^6$ ............................................. H01S 3/10
[52] U.S. Cl. ............... 372/20; 359/330; 372/21; 372/69; 372/92; 372/98
[58] Field of Search .............. 359/330; 372/20, 372/92, 21, 69, 98

[56] References Cited

U.S. PATENT DOCUMENTS

| | | | |
|---|---|---|---|
| 5,033,057 | 7/1991 | Bosenberg et al. | 372/72 |
| 5,047,668 | 9/1991 | Bosenberg | 359/330 |
| 5,053,641 | 10/1991 | Cheng et al. | 359/330 |
| 5,390,211 | 2/1995 | Clark et al. | 272/95 |
| 5,400,173 | 3/1995 | Komine | 359/330 |
| 5,457,707 | 10/1995 | Sobey et al. | 372/20 |

FOREIGN PATENT DOCUMENTS 42 19 169 A1   6/1992   Germany ............. H01S 3/10

OTHER PUBLICATIONS

"Broadly tunable, single–frequency optical parametric frequency–conversion system" J. Opt. Soc. Am. B/vol. 10, No. 9/Sep. 1993; W.R. Bosenberg and D.R. Guyer; pp. 1716–1722.

Reid, et al., "Ti:Sapphire–pumped femtosecond optical parametric oscillators based on KTiOPO$_4$ and RTiOAsO$_4$," *Applied Physics B*, 1995, vol. 60, 437–442.

Chen, et al., "Design and synthesis of an ultraviolet–transparent nonlinear optical crystal Sr$_2$Be$_2$B$_2$O$_7$," *Nature*, 26 Jan. 1995, vol. 373, pp. 322–324.

*Primary Examiner*—Leon Scott, Jr.
*Attorney, Agent, or Firm*—Limbach & Limbach L.L.P.

[57] ABSTRACT

A tunable narrowband source of a coherent radiation, comprising a first optical parametric oscillator (OPO1) which includes at least one first optical parametric amplifier medium (K$_1$) in a resonator (18, 20; 20, 34) or an optical parametric generator;

at least one second optical parametric oscillator (OPO2) which includes at least one second optical parametric amplifier medium (K$_2$) in a resonator (22, 24) and into which is coupled the output radiation (28; 28b) of the first optical parametric oscillator (OPO1);

at least one third optical parametric amplifier medium (OPA) into which is coupled the output radiation (30) of the second optical parametric oscillator (OPO2); and means (12, 14, 16, 26) for generating and coupling the pump radiation (10, 10') into the first and second optical parametric oscillators (OPO1, OPO2) and into the third optical parametric amplifier medium OPA), wherein the output radiation (28; 28b) of the first optical parametric oscillator (OPO1) which is coupled into the second optical parametric oscillator (OPO2) has a bandwidth which is smaller than the spacing of the only one longitudinal mode is excited and coupled into the third optical parametric amplifier medium (K$_3$, K$_4$) and amplified therein.

12 Claims, 2 Drawing Sheets

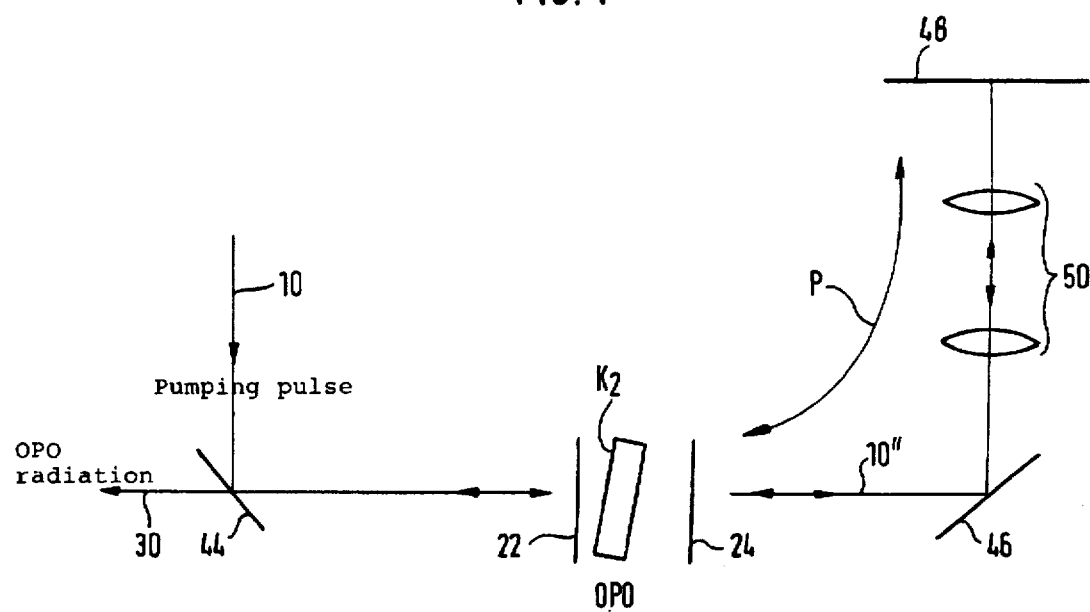

TUNABLE NARROWBAND SOURCE OF A COHERENT RADIATION

The invention relates to a tunable narrowband source of a coherant radiation with several tunable optical parametric oscillators (OPO's).

Such OPO's include optical parametric amplifier media (generally optically non-linear crystals) which are arranged in optical resonators. Generally, a distinction is made between optical parametric oscillators (OPO), optical parametric amplifiers (OPA) and optical parametric generators (OPG). The optical parametric amplifier comprises an optical parametric amplifier medium (e.g. a crystal) which is not arranged in an optical resonator. The optical parametric generator comprises an optical parametric amplifier medium which is pumped so strongly that the parametric fluorescence in the single or multiple passage is amplified in an avalanche-like manner.

The principle of the optical parametric oscillation has been known since 1965 (J. A. Giordaime and R. C. Miller). If the optical parametric amplifier medium within the resonator is excited by the so-called pump radiation, a radiation with two different wavelengths is generated by means of mixing of frequencies. The third harmonic of the Nd: YAG laser is a typical pump radiation with a wavelength of 355 nm. The shortwave radiation generated in the amplifier medium by means of frequency mixing is referred to as signal radiation and the radiation with a greater wavelength is referred to as idler radiation. Due to the conservation of energy, the sum of the frequencies of the signal and the idler radiation is equal to the frequency of the pump radiation. The wavelengths of signal and idler radiation can be tuned by changing the so-called phase matching. With a given pump wavelength this can be done, for example, by means of changing the angular orientation of the non-linear crystal with respect to the pump radiation, or by changing the crystal temperature. With a stationary crystal the wavelengths of the signal and idler radiation can also be tuned by means of changing the pump wavelength. Consequently, an OPO is a source of a tunable coherent radiation. When using e.g. β-barium borate (BBO) and the third harmonic of the Nd: YAG laser, it is currently possible to tune (change) the wavelength of the signal radiation approximately in the range from 410 nm to 710 mn, while simultaneously the wavelength of the idler radiation is swept in the range from 2500 nm to 710 nm.

In U.S. Pat. No. 5,053,641 such a tunable source of a coherent radiation is disclosed with an OPO which uses a BBO crystal (β-BaB$_2$O$_4$) in the resonator. The pump pulse is focused in the optically non-linear crystal by means of one of the two resonator mirrors. The tuning (change) of the wavelength of the output radiation is effected by means of rotating the crystal about an axis which is perpendicular the the optical axis of the resonator.

According to U.S. Pat. No. 5,033,057 the arrangement was modified in such a manner that two mirrors are disposed in the resonator for the pump radiation to be coupled in or coupled out, respectively.

The two above mentioned OPO arrangements are characterized in that the bandwidth of the emitted OPO radiation is essentially determined by the spectral width of the optical parametric amplifier profile. This applies to both the signal and the idler radiation. Depending on the wavelength, the spectral width of the amplifier profile typically ranges from approx. 5 to 50 cm$^{-1}$, for example when using BBO as the amplifier medium.

For a multitude of applications, in particular in the field of spectroscopy, it is, however, desirable to have a tunable radiation available the spectral bandwidth of which is markedly smaller, e.g. below 0.2 cm$^{-1}$ down to individual longitudinal modes with bandwidths of approx. 0.01 cm$^{-1}$ and below. The generation of a tunable coherent radiation with such narrow bandwidths is the subject of the present invention.

In an article in J. Opt. Soc. Am. vol. 10, 1716 (1993) W. R. Bosenberg et al. describe a narrowband tunable OPO. The pulsed operated resonator incorporates a grating as the wavelength selective element, in addition to the non-linear crystal. The grating is employed with grazing incidence.

Another arrangement of a narrowband pulsed OPO is described in DE 42 19 169 A1. This source for the generation of a tunable narrowband coherent radiation comprises a first OPO as the so-called seed oscillator which does not include any frequency selective elements in the resonator for reducing the bandwidth. A frequency selective element is arranged outside of the resonator, which filters a narrow spectral range from the relatively wideband output radiation. This narrowband radiation is then supplied to a second OPO which as a power oscillator amplifies the radiation.

The two above mentioned sources of a tunable narrowband coherent radiation have drawbacks.

The arrangement of a grating in a so-called Littmann resonator as described in the article by W. R. Bosenberg et al. causes considerable radiation losses in the resonator. With grazing incidence, even good gratings have diffraction reflectivities of less than 20 to 50% in the wavelength range considered in this context. Since the radiation passes the grating twice during each circulation in the resonator, the resonator losses caused by the grating amount to more than 80%. The consequence is that the threshold of the narrowband oscillation is very high and the individual optical components are subjected to extreme loads. These drawbacks will be even more pronounced when an optical parametric amplifier medium with a wide gain bandwidth, such as BBO or LBO is used (the referenced state of the art uses KTP with a relatively small gain bandwidth).

The arrangement as described in DE 42 19 169 A1 avoids the problems of the OPO resonator in conjunction with grating losses, however, passive losses for the seed radiation of the second OPO are introduced which will be all the greater, the greater the ratio of the bandwidth of the output radiation of the first OPO to the bandwidth of the external spectral filter. Because the minimum required seed energies for a stable narrowband operation of the seeded power oscillator are fixed for a given arrangement, the required energy of the pump radiation which has to be supplied to the first OPO will be increased to the same extent by which the bandwidth of the output radiation is to be reduced. When considering, for example, a BBO-OPO which is pumped by the third harmonic of an Nd: YAG laser and which starts the oscillation with a bandwidth of 50 cm$^{-1}$, then the reduction of the bandwidth by means of the external spectral filtering of the radiation to 0.05 cm$^{-1}$ causes an energy reduction by a factor of 1000. Due to the fact that typical seed energies for optical parametric power oscillators are in the range from 10 µJ to 100 µJ, an output radiation from the first OPO with energies in the range from 10 mJ to 100 mJ is required. This, however, requires pump energies for the first OPO in the range from 100 mJ to 1 J.

In the arrangement according to DE 42 19 169 A1 the grating losses or the above described passive filter losses can be avoided in that the first OPO resonator is built as short as possible. In such a short resonator only a few longitudinal modes will start oscillation so that the total losses of useful radiation caused by an external spectral filtering can be reduced. With this known arrangement, the external losses can be reduced in that the seed OPO is built very short so that the longitudinal modes of the resonator have a relatively large spacing. The total output energy is then discretely distributed to the individual modes starting oscillation so that the external spectral losses will be reduced. In order to reduce the losses due to the external spectral filtering to the factor of 50 (see also the above factor of 1000), for example, with a gain bandwidth of 50 $cm^{-1}$, only 50 longitudinal modes of the OPO resonator are allowed to start oscillation. This requires a mode spacing of the OPO resonator of 1 $cm^{-1}$ and means that the optical parametric amplifier medium would have to be shorter than 3.3 mm.

Another problem of this known OPO arrangement is that the statistical nature of the start of oscillation of the individual longitudinal modes prevents a stable operation of the OPO with pulsed as well as with continuous (cw) excitation. The intensities of the individual longitudinal modes are subject to statistical laws so that the energy contained in a mode which starts oscillation at a certain wavelength is also varying statistically. The so-called mode competition leads to energy fluctuations due to the spontaneous parametric processes. Such energy fluctuations can be as high as 100%. This will result in a very poor energy stability of the output radiation.

The invention is based on the object to provide a tunable narrowband source of a coherent radiation, comprising the optical parametric oscillators of the initially mentioned type, in which the internal and external resonator losses are reduced, the energy stability is increased, the oscillation threshold of the OPO's is lowered and the stability and efficiency of the source is increased, a great number of nonlinear crystals can be employed alternatively as optical parametric amplifier media and the risk of optical components being destroyed by an excessive radiation load is prevented.

According to the invention, these objects are achieved by means of a tunable narrowband source of a coherent radiation, comprising a first optical parametric oscillator which includes at least one first optical parametric amplifier medium in a resonator or an optical parametric generator, at least one second optical parametric oscillator which includes at least one second optical parametric amplifier medium in a resonator and into which the output radiation of the first optical parametric oscillator is coupled, at least one third optical parametric amplifier medium into which the output radiation of the second optical parametric oscillator is coupled, and means for generating pump radition and coupling it into the first and second optical parametric oscillators and into the third optical parametric amplifier medium, wherein the output radiation of the first optical parametric oscillator which is coupled into the second optical parametric oscillator has a bandwidth which is smaller than the longitudinal mode spacing of the second optical parametric oscillator and said output radiation of the first optical parametric oscillator is coupled into the second optical parametric oscillator in such a manner that only one longitudinal mode is excited in the second optical parametric oscillator which longitudinal mode is coupled into the third optical parametric amplifier medium and amplified therein.

With this tunable narrowband source of a coherent radiation consisting of at least two OPO's and and least one OPA, a mode selection in several stages is achieved.

According to a preferred embodiment of the invention the bandwidth of the output radiation of the first optical parametric oscillator due to the structure of the first optical parametric oscillator is adjusted in such a manner that it is smaller than the spacing between the longitudinal modes of the second optical parametric oscillator.

Alternatively, it is also possible to sufficiently reduce the bandwidth of the radiation coupled into the second optical parametric oscillator by means of coupling the output radiation of the first optical parametric oscillator via an element for limiting the bandwidth into the second optical parametric oscillator.

Between each of the above mentioned individual OPO or OPA stages certain optical delay lines are provided. These delay lines and the associated times are tuned to the delay lines and times which are covered by the pump radiation. This tuning (time control of the radiations) is of such a nature that the pump radiation is always coupled into the crystals when its amplification effect with respect to the OPA or OPO radiation to be amplified is at an optimum. The delay lines can include optically imaging elements which compensate the diffraction effects associated with the radiation propagation (so-called "relay imaging").

In a preferred embodiment the above mentioned OPO's or OPA's, respectively, each can optionally be equipped with two optical parametric crystals, or a compensator can be provided for the so-called "walk-off" compensation.

Each of the first and/or the second optical parametric oscillator can include a wavelength selective element.

Wavelength selective elements (frequency selective elements) are, for example, gratings, etalons, prisms etc.

According to a preferred embodiment of the invention, the third optical parametric amplifier medium is also arranged in an OPO (i.e. it is no OPA).

In this case the longitudinal mode spacing of the third optical parametric amplifier medium which is arranged in an optical resonator is preferably greater than the bandwidth of the radiation emitted by the second optical parametric oscillator coupled into said amplifier medium.

Crystals from the following materials are preferred as materials for the optical parametric amplifier media: BBO, LBO, CLBO, CBO, SBBO, KTP, KTA, KNB, KBBF, RTA, $LiNbO_3$, $LiJO_3$, $AgGaS_2$ or $AgGaSe_2$.

In order to tune the wavelength of the source of a coherent radiation provisions can be made so that the first, second and the at least one third optical parametric amplifier media are rotably supported and that the resonator of the first optical parametric amplifier medium and the resonator of the second optical parametric amplifier medium comprise means for adjusting the resonator length so that with a synchronized rotation of the third optical parametric amplifier medium and adjustment of the resonator lengths the narrowband output radiation can continuously be tuned over a wide wavelength range.

Another possibility of tuning the wavelength of the source of a coherent radiation is given in that the at least one third optical parametric amplifier medium is supported so as to be rotable and that at least the first and second optical parametric oscillators are arranged in a pressure-sealed housing and a means is provided for changing the gas pressure in the housing so that with a synchronized rotation of the optical parametric amplifier medium and change of the gas pressure in the housing the narrowband output radiation can be continuously tuned over a wide wavelength range.

The inventive tunable narrowband source of coherent radiation can be pumped both in a pulsed and a continuous manner.

In the following, embodiments of the invention will be described in more detail with reference to the drawing.

FIG. 4 shows a special arrangement for the pumping of a crystal which can be employed in the embodiments according to FIGS. 1, 2 and 3.

Figure 1:
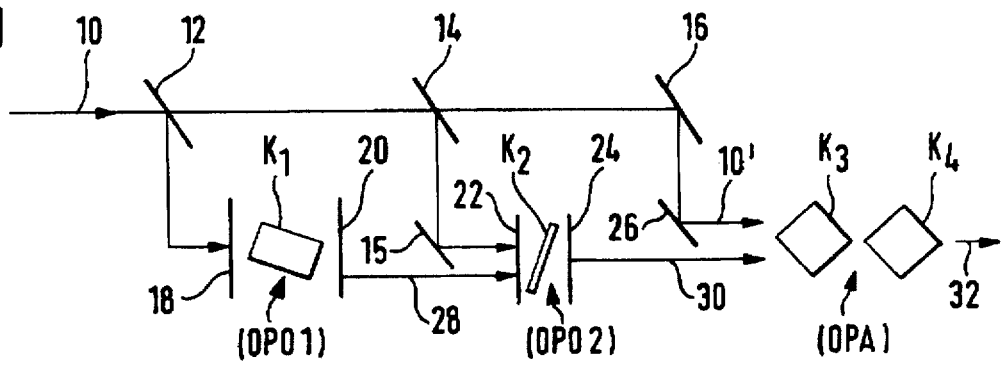
FIGS. 1, 2 and 3 shows various embodiment of tunable narrow-band sources of coherent radiation.

In the embodiment according to FIG. 1, two optical parametric oscillators OPO1 and OPO2 as well as one optical parametric amplifier OPA1 are provided.

A pump radiation for the pumping of the OPO's or the OPA, respectively, is generated in a manner known per se (not shown in detail). The third harmonic of an Nd: YAG laser can, for example, be used as a pump radiation 10.

The pump radiation 10 is coupled into the OPO1 and the OPO2 by means of partially transmitting mirrors 12 and 14. The partially transmitting mirrors 12 and 14 are designed in such a manner that a portion of the pump radiation can also be coupled into the OPA via mirrors 16, 26 in the form of a pump radiation 10'.

The first optical parametric oscillator OPO1 comprises an optically non-linear crystal $K_1$ which is arranged between two resonator mirrors 18, 22. In the embodiment according to FIG. 4 the first OPO1 is so selected with respect to its geometry (structure) that its output radiation 28 has a spectral bandwidth (e.g. full width at half maximum) which is smaller than the spacing between two longitudinal modes of the second optical parametric oscillator OPO2. The second optical parametric oscillator OPO2 comprises a crystal $K_2$ between two resonator mirrors 22, 24. The pump radiation (via mirrors 14 and 15) and the above described output radiation 28 of the first OPO1 are coupled into the OPO2. The second OPO2 is designed in such a manner that by the radiation coupled into it only one single longitudinal mode is excited in the OPO2. A radiation 30 emitted by the OPO2 is coupled into an optical parametric amplifier OPA which in the embodiment according to FIG. 1 comprises two non-linear optical crystals $K_3$, $K_4$. At the same time, the pump radiation 10' is coupled into the crystals $K_3$, $K_4$. The only longitudinal mode emitted by the OPO2 is thus amplified by the OPA and output as an extremely narrowband coherent radiation 32. The radiation is tunable in a manner as will later be described in greater detail.

Figure 2:
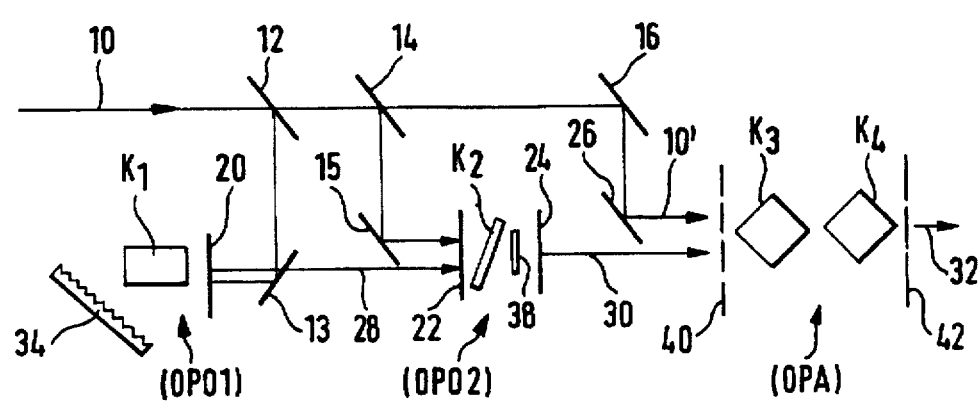

FIG. 2 shows a modified embodiment. Components with identical or similar functions are assigned the same reference numerals in the figures. In the embodiment according to FIG. 2 the resonator of the first OPO1 is formed by a self-collimating grating or by a grating 34 operated with grazing incidence and a mirror 20. The non-linear crystal $K_1$ is arranged between the grating 34 and the mirror 20. The pump radiation 10 is coupled into the first OPO1 via the partially transmitting mirror 12 and a fully reflecting mirror 13. The output radiation 28 of the OPO1 (e.g. the signal radiation) passes the mirror 13 and its bandwidth is reduced to such an extent that in the second optical parametric OPO2 one longitudinal mode only is excited. An additional wavelength selective element 38 can be arranged in the second optical parametric oscillator OPO2. The wavelength selective element 38 is, however, not mandatory but optional only. The output radiation 30 of the OPO2 consists of only one single longitudinal mode of the OPO2 and is supplied, together with the pump radiation 10' to an OPA. In the embodiment according to FIG. 2 the OPA again consists of one or two non-linear crystals $K_3$ and $K_4$. The OPA (Optical Earametric Amplifier) can be modified to an OPO (Optical Earametric Oscillator) by means of arranging the non-linear crystals $K_3$ and, if required, $K_4$ between resonator mirrors 40, 42 which are indicated in FIG. 2 by broken lines. In the embodiment according to FIG. 2 it is therefore possible to optionally omit or add, respectively, the wavelength selective element 38 of the OPO2 and/or the resonator mirrors 40, 42.

The embodiment according to FIG. 3 is again similar to that of FIG. 1, however a wavelength selective element is arranged between the first optical parametric oscillator OPO1 and the second optical parametric oscillator OPO2. In the illustrated embodiment this wavelength selective element is a grating 36. A radiation 28a which is emitted by the OPO1 is deflected by a mirror 38 with grazing incidence to the grating 36. The radiation 28b with a considerably reduced bandwidth is coupled into the second optical parametric oscillator OPO2 via a mirror 40. The grating 36 ensures that the bandwidth of a radiation 28b which is coupled into the OPO2 is smaller than the longitudinal mode spacing of two longitudinal modes of the second optical parametric oscillator OPO2. The output radiation 30 which corresponds to a single longitudinal mode of the OPO2 is amplified in an OPA which in the embodiment according to FIG. 3 incorporates two crystals $K_3$, $K_4$.

The following crystals are taken into consideration as the material for the non-linear crystals: BBO, LBO, CLBO, CBO, SBBO, KTP, KTA, KNB, KBBF, RTA, $LiNbO_3$, $LiJO_3$, $AgGaS_2$ or $AgGaSe_2$.

Figure 3:
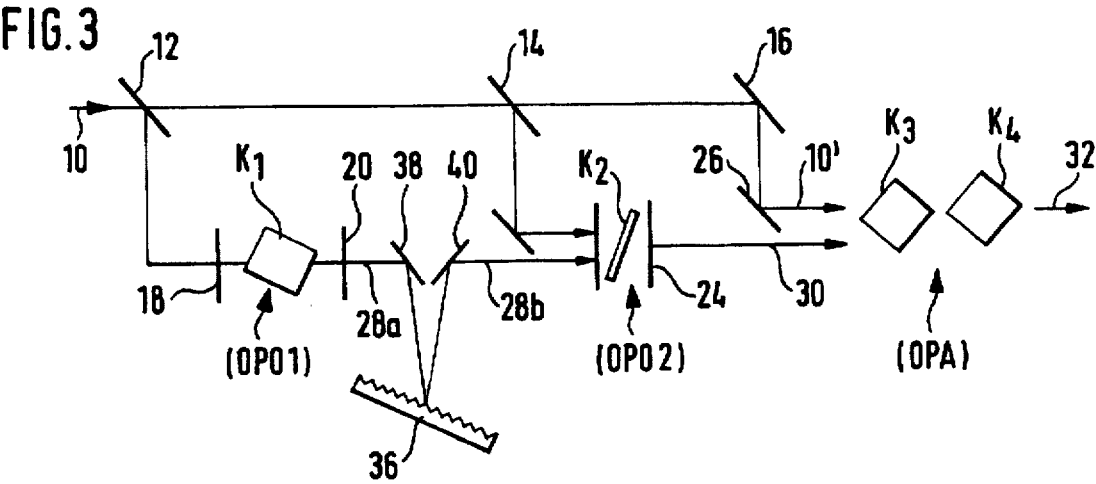

In order to tune (change) the wavelength of the source of a coherent radiation 32 according to FIGS. 1 to 3 the crystals $K_1$ and $K_2$ as well as the crystal or the crystals, respectively, of the OPA (i.e. one crystal $K_3$ or both crystals $K_3$, $K_4$, depending on the embodiment) can be supported so as to be rotatable, and the lengths of the resonators of the optical parametric oscillators OPO1 and OPO2 and, if required, also of the OPO3, provided it is not configured as an OPA, are adjusted corresponding to the rotation of the crystals, for example in that a mirror of the respective resonator (e.g. the mirror 20 and the mirror 24) is shifted by means of a piezoelectric crystal. The length of the OPO1 need not necessarily be adjusted.

By means of rotating the crystal (or the crystals, respectively) of the OPA and the synchronous adjustment of the resonator lengths the wavelength of the emitted narrowband radiation 32 can be tuned over a wide range of wavelengths.

Another possibility of tuning the wavelength is to support the optical parametric amplifier medium of the OPA again so as to be rotable and to simultaneously arrange the other OPO's in a pressure-sealed housing (not shown) and to change the gas pressure in the housing in accordance with the rotation of the optical parametric amplifier medium in the OPA. This also enables the tuning of the wavelength of the radiation 32 over a wide range.

The pump radiation 10 can be pulsed as well as continuous.

When using very short pump pulses (for example pump pulses with a pulse duration of 1 to 2 ns) it can be advantageous to excite at least one or also several of the crystals ($K_1$, $K_2$, $K_3$, $K_4$) twice in succession. An optical arrangement for such an excitation of a crystal repeated twice is shown in FIG. 4 by way of example and schematically with respect to the crystal $K_2$ of the OPO2. Each OPO, OPA, or optical parametric generator, respectively, according to the embodiments of FIGS. 1, 2 and 3 can thus be provided optionally with an optical arrangement according to FIG. 4, in particular when using very short pump pulses. The optical arrangement is then mutatis mutendis integrated once or several times in the optical systems according to FIGS. 1, 2 or 3. The optical arrangement for the double excitation of a crystal according to FIG. 4 is supplied with a pump pulse 10 which, for example, can have a wavelength of 355 nm (see above). A mirror 44 is highly reflective for the 355 nm wavelength so that the pump pulse 10 can be coupled into the crystal $K_2$ of the OPO2. The first passage of the pump pulse 10 through the crystal $K_2$ excites the optical parametric oscillation for the first time. The pump beam 10" which is emitted from the OPO via the resonator mirror 24 impinges on a mirror 46 which is highly reflective for the 355 nm wavelength radiation, from where it is directed to another highly reflective mirror 48, with the beam passing through an imaging optic 50 which provides for the beam which was reflected again by the mirror 48 to be accurately imaged into the crystal $K_2$. The reciprocating travel of the pump beam 10" between the crystal $K_2$ and the mirror 48 is indicated by an arrow P in FIG. 4. With the pump radiation exciting the optical parametric oscillation upon its first passage through the crystal $K_2$, the second passage of the pump pulse which is reflected by the mirror 48 takes place at a somewhat later time at which a further amplification of the parametric radiation is most effective. The time sequence of the two pump pulses coupled into the crystal $K_2$ can be adjusted by means of the delay lines (travel times between the mirrors 46, 48 etc.) depending on the given optical system. The time period between the coupling of the pump pulses in the crystal $K_2$ for pump pulses which themselves have a pulse duration of only 1 to 2 ns also amounts to a few nanoseconds.

The sources of a tunable narrowband coherent radiation according to FIGS. 1 to 3 are designed in such a manner with respect to the travel times between the mirrors and the spacings between the individual crystals (also without the modification according to the embodiment of FIG. 4) that the pump pulses are coupled into the crystals in a time synchronized manner with respect to the respective signal or the idler radiations to be amplified.

In a modification of the above described embodiment according to FIGS. 1 to 3 the first OPO1 can be replaced by a so-called optical parametric generator. An optical parametric generator comprises an optical parametric crystal without a resonator mirror. When an optical parametric generator is used a wavelength selective element is employed in order to reduce the bandwidth of the radiation coupled into the second optical parametric oscillator OPO2 to such an extent that it is smaller than the spacing of the longitudinal modes of the second optical parametric oscillator OPO2.

As a modification to the above described embodiment it is also possible to equip each of the remaining OPO's with two optical parametric crystals (corresponding to the OPA; $K_3$, $K_4$) or with a compensator for the so-call "walk-off". The "walk-off compensation" takes the following condition into consideration. In spite of the phase matching, the energy contained in finite radiation diameters propagates in slightly different directions in non-linear optical crystals. The consequence of this is that after a finite travel, e.g. the pump beam and the initially generated oscillator beam have diverged. This diverging effect can be compensated in that an identical medium of the same length but opposite orientation is passed. This is known per se to those with skill in the art.

The described embodiments can further be modified in that the OPO2 is pumped by a "not consumed" pump radiation of the OPO1, i.e. the pump radiation for the OPO2 in this modification does not (exclusively) travel via the mirrors 14 and 15 but via the mirrors 12 and the OPO1.

What is claimed is:

1. A tunable narrowband source of a coherent radiation, comprising a first optical parametric oscillator (OPO1) which includes at least one first optical parametric amplifier medium ($K_1$) in a resonator (18, 20; 20, 34) or an optical parametric generator instead of the first optical parametric oscillator;

at least one second optical parametric oscillator (OPO2) which includes at least one second optical parametric amplifier medium ($K_2$) in a resonator (22, 24) and into which the output radiation (28; 28b) of the first optical parametric oscillator (OPO1) is coupled;

at least one third optical parametric amplifier medium (OPA) into which the output radiation (30) of the second optical parametric oscillator (OPO2) is coupled; and means (12, 14, 16, 26) for generating pump radiation (10, 10') and coupling it into the first and second optical parametric oscillators (OPO1, OPO2) and into the third optical parametric amplifier medium OPA), wherein the output radiation (28; 28b) of the first optical parametric oscillator (OPO1) which is coupled into the second optical parametric oscillator (OPO2) has a bandwidth which is smaller than the spacing of the longitudinal modes of the second optical parametric oscillator (OPO2) and the output radiation (28; 28b) of the first optical parametric oscillator (OPO1) is coupled into the second optical parametric oscillator (OPO2) in such a manner that only one longitudinal mode is excited in it which is coupled into the third optical parametric amplifier medium ($K_3$, $K_4$) and amplified therein.

2. A tunable narrowband source of a coherent radiation according to claim 1, characterized in that the bandwidth of the output radiation (28) of the first optical parametric oscillator due to the structure of said oscillator is adjusted in such a manner that it is smaller than the spacing between the longitudinal modes of the second optical parametric oscillator (OPO2).

3. A tunable narrowband source of a coherent radiation according to claim 1, characterized in that the output radiation (28a) of the first optical parametric (OPO1) is coupled into the second parametric oscillator (OPO2) via an element (36) for narrowing the bandwidth.

4. A tunable narrowband source of a coherent radiation according to claim 1, characterized in that the first optical parametric (OPO1) comprises a wavelength selective element (34).

5. A tunable narrowband source of a coherent radiation according to claim 1, characterized in that the first (OPO1) and/or the second optical parametric oscillator (OPO2) comprise a wavelength selective element (34 or 38, respectively).

6. A tunable narrowband source of a coherent radiation according to claim 1, characterized in that the at least one third optical parametric amplifier medium ($K_3$) is arranged in an optical resonator (40, 42).

7. A tunable narrowband source of a coherent radiation according to claim 1, characterized in that the longitudinal mode spacing of the third optical parametric amplifier medium ($K_3$) arranged in an optical resonator is greater than the bandwidth of the radiation coupled into it and emitted by the second optical parametric oscillator (OPO2).

8. A tunable narrowband source of a coherent radiation according to claim 1, characterized in that crystals are used as optical parametric amplifier media ($K_1$, $K_2$, $K_3$, $K_4$) which are selected from the following group: BBO, LBO, CLBO, CBO, SBBO, KTP, KTA, KNB, KBBF, RTA, $LiNbO_3$, $LiJO_3$, $AgGaS_2$ or $AgGaSe_2$.

9. A tunable narrowband source of a coherent radiation according to claim 1, characterized in that the pump radiation (10) is pulsed.

10. A tunable narrowband source of a coherent radiation according to claim 1, characterized in that the pump radiation (10) is continuous.

11. A tunable narrowband source of a coherent radiation according to claim 1, characterized in that the optical parametric amplifier media ($K_1$, $K_2$) of the first optical parametric oscillator (OPO1) or generator and of the second optical parametric oscillator (OPO2) and the at least one third optical parametric amplifier medium ($K_3$, $K_4$) are ratably supported and that the resonator of the first optical parametric amplifier medium ($K_1$) and the resonator of the second optical parametric amplifier medium ($K_2$) and, if required, of the third optical parametric oscillator comprise means for adjusting the resonator length so that with a synchronized rotation of the third optical parametric amplifier medium ($K_3$, $K_4$) and adjustment of the resonator lengths the narrowband output radiation (32) can continuously be tuned over a wide wavelength range.

12. A tunable narrowband source of a coherent radiation according to claim 1, characterized in that the at least one third optical parametric amplifier medium ($K_3$, $K_4$) is supported so as to be rotable and that at least the first and second optical parametric oscillators (OPO1, OPO2) are arranged in a pressure-sealed housing and means are provided for changing the gas pressure in the housing so that with a synchronized rotation of the optical parametric amplifier medium ($K_3$, $K_4$) and change of the gas pressure in the housing the narrowband output radiation (32) can be continuously tuned over a wide wavelength range.

* * * * *